Jan. 19, 1943.     C. E. JOHNSON     2,308,813

VARIABLE-SPEED POWER DEVICE

Original Filed May 1, 1933

INVENTOR
CARL E. JOHNSON
BY
HARRIS, KIECH, FOSTER & HARRIS

FOR THE FIRM
ATTORNEYS

Patented Jan. 19, 1943

2,308,813

UNITED STATES PATENT OFFICE 2,308,813

VARIABLE-SPEED POWER DEVICE

Carl E. Johnson, San Marino, Calif., assignor to Sterling Electric Motors, Inc., Los Angeles, Calif., a corporation of California Original application May 1, 1933, Serial No. 668,772. Divided and this application May 17, 1941, Serial No. 393,867

5 Claims. (Cl. 74—230.17)

This application is a division of my copending application Serial No. 668,772, filed May 1, 1933, now matured into Patent No. 2,267,566 issued December 23, 1941, for Variable-speed power device, to which reference is hereby made.

My invention relates in general to power devices adapted to drive machinery at variable speeds, and relates particularly to power devices having variable-diameter belt and pulley transmission means.

The objects of my present invention are in general to provide in variable-speed power devices having one or more variable-diameter pulleys simple means whereby the variable-diameter pulley or pulleys may be quickly and positively adjusted to produce a desired speed of a power output or power delivery shaft which is adapted to be connected to a power utilizing device in accordance with the known practices of coupling, gearing, or belting; and to produce certain important improvements in the construction of variable-speed power devices as hereinafter set forth.

The present invention may be embodied in a unitary power device having a power or motivating element such as a motor and a driven member as represented by a shaft. On the motor and on the shaft cooperating V-belt pulley members are placed, the effective diameters of which are varied by relative axial movement of their flanges. In this form of the invention interconnected screw means are provided at each of the variable-diameter pulleys for simultaneously adjusting the pulleys so as to produce a decrease in the diameter of one pulley as the effective diameter of the other pulley is increased, there being means for maintaining the belt in the necessary tight operating engagement with the pulleys.

Further objects and advantages of the invention will be made evident throughout the following part of the specification.

Referring to the drawing, which is for illustrative purposes only,

Figure 1:
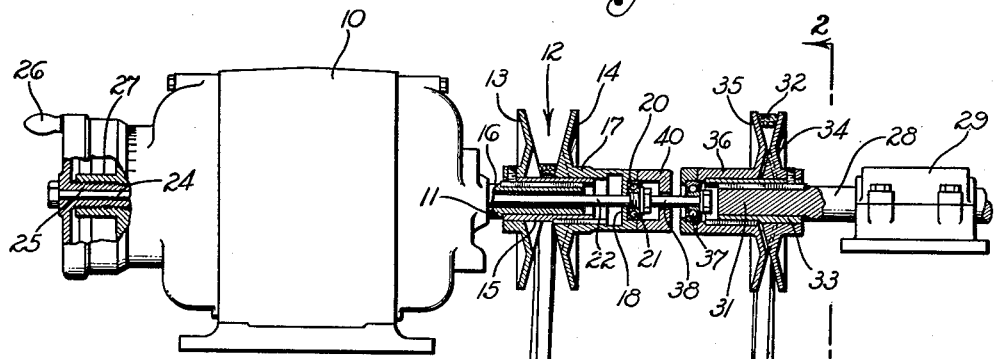
Fig. 1 is a partly sectioned elevational view showing my invention, in which the driving and driven pulleys are axially aligned and are connected by a V-belt extending over idler pulleys.
Figure 2:
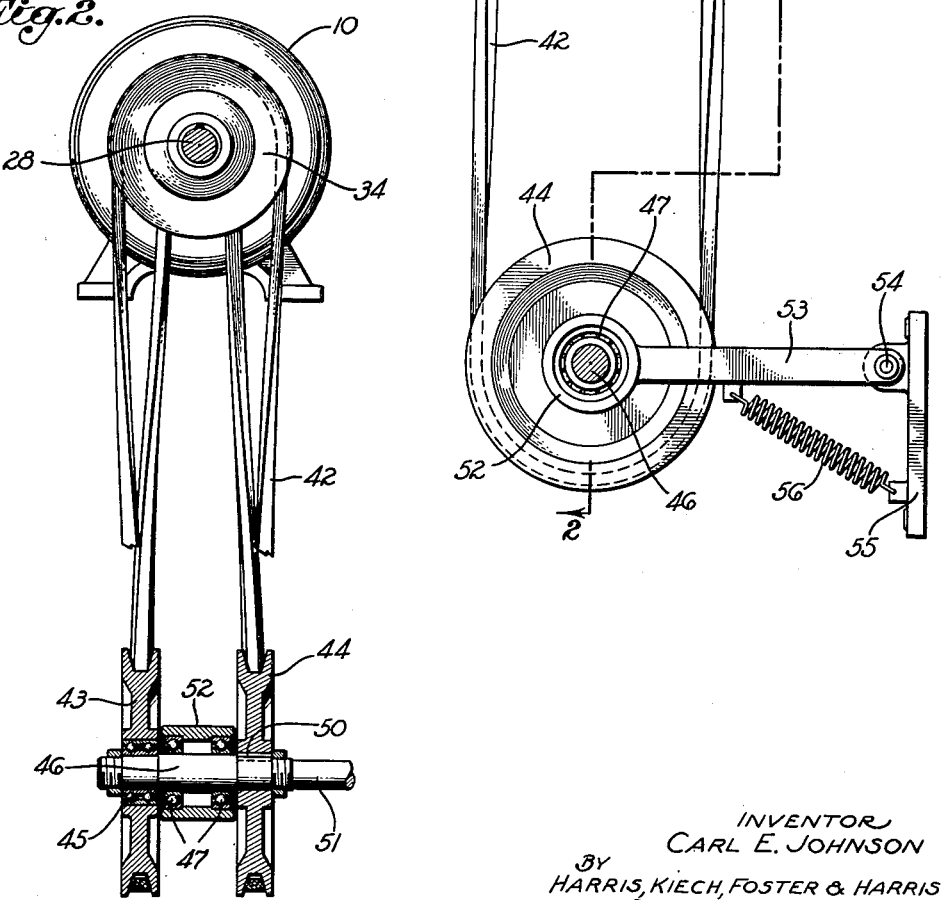
Fig. 2 is a sectional view taken as indicated by the line 2—2 of Fig. 1.

As will be perceived from Figs. 1 and 2, my invention contemplates the use of a driving and driven V-type pulley situated in axial alignment. In Figs. 1 and 2 I show a motor 10 having a hollow shaft 11 on which a variable-diameter V-type pulley 12 is mounted, such pulley 12 comprising a fixed flange 13 and an axially movable flange 14, both of these flanges 13 and 14 being mounted upon a sleeve 15 carried upon the rightwardly projecting end 16 of the shaft 11. The axially movable flange 14 has a rightwardly extending hub or sleeve 17 provided with an end wall 18 in which a bearing recess 20 is formed for the purpose of receiving a thrust bearing 21 which is connected to an axial shaft 22 which extends leftwardly through the axial opening of the hollow shaft 11. The leftward end 24 of the bar 22 is secured to a threaded member 25 adapted to be rotated by a handle 26. As the threaded member 25 screws in and out of an internally threaded stationary part 27 secured to the leftward end of the motor 10, the bar 22 will be correspondingly rotated and will be moved axially so as to transmit axial movement through the bearing 21 to the axially movable flange 14, whereby to change the spacing of the flanges 13 and 14, and consequently vary the effective diameter of the pulley 12.

A shaft 28 is supported by bearing means 29 in alignment with the motor shaft 11, and on the leftwardly extending end 31 of the shaft 28 a variable-diameter V-type pulley 32 is mounted, this variable-diameter pulley 32 comprising a sleeve member 33 adapted to be secured upon the end 31 of the shaft 28, a fixed flange 34, and an axially movable flange 35. The axially movable flange 35 has a hub or sleeve 36 which projects toward the sleeve 17 of the pulley 12, and in the leftward end of the sleeve 36 a thrust bearing 37 is mounted for connection to a means for controlling the axial movement of the flange 32. For this purpose the bar 22 is provided with an extending end 38 which projects through a protective shaft or housing 40 placed over the bearing 21 and is secured to the inner race of the ball bearing 37. Consequently, when the bar 22 is moved leftwardly from the position in which it is shown in Fig. 1, it will move the flange 14 toward the flange 13 of the pulley 12 and will move the flange 35 leftwardly away from the flange 34 of the pulley 32, thereby increasing the effective diameter of the pulley 12 and correspondingly decreasing the effective diameter of the pulley 32.

Driving connection between the pulleys 12 and 32 is accomplished through the use of a V-belt 42 which is carried over idler V-type pulleys 43 and 44 mounted to one side of or below the axis of the motor shaft 11 and of the shaft 28. One of the pulleys, such as the pulley 43, is mounted by means of a ball bearing 45 upon a shaft 46 which is turnable in bearings 47. The other idler pulley 44 may be secured directly to the shaft 46 so as to drive this shaft through key means such as shown at 50; accordingly, a projecting end 51 of the shaft 46 may be employed for driving purposes, if desired. The bearings 47 are held in a head 52 formed in the outer end of a bracket arm 53 which is pivotally secured at 54 to a plate 55 so as to swing under the force of a spring 56 in a direction to carry the pulleys 43 and 44 away from the pulleys 12 and 32, thereby maintaining a desired tension in the belt at all times. As shown, a long belt is employed, and consequently a resilient drive connection is obtained in a relatively small space for the reason that the long V-belt is looped over the pair of idler pulleys 43 and 44.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein, but is to be accorded the full scope of the following claims.

I claim as my invention:

1. In a variable-speed transmission device, the combination of: a hollow drive shaft; a driven shaft; a pulley on one end of said drive shaft and a pulley on said driven shaft, each of said pulleys being of the variable-diameter V-type having a pair of flanges one of which is axially movable relative to the other flange; an axially adjustable rod means extending through said hollow drive shaft and being operatively connected to both of said movable flanges; adjustment means at the other end of said drive shaft and operatively connected to said adjustable rod means so that upon actuation of said adjustment means said adjustable rod means and said movable flanges are moved axially to increase the effective diameter of one of said pulleys and to decrease the effective diameter of the other of said pulleys; belt means operatively connecting said pulleys; and resilient means for maintaining tension in said belt means.

2. In a variable-speed transmission device, the combination of: a motor having a hollow drive shaft; a driven shaft; a pulley on one end of said drive shaft at one side of said motor and a pulley on said driven shaft, each of said pulleys being of the variable-diameter V-type having a pair of flanges one of which is axially movable relative to the other flange; an axially adjustable rod means extending through said hollow drive shaft and being operatively connected to both of said movable flanges; adjustment means on the other side of said motor and operatively connected to said adjustable rod means so that upon actuation of said adjustment means said adjustable rod means and said movable flanges are moved axially to increase the effective diameter of one of said pulleys and to decrease the effective diameter of the other of said pulleys; belt means operatively connecting said pulleys; and resilient means for maintaining tension in said belt means.

3. In a variable-speed transmission device, the combination of: a motor having a hollow drive shaft; a driven shaft axially aligned with said drive shaft; a pulley on one end of said drive shaft at one side of said motor and a pulley on said driven shaft, each of said pulleys being of the variable-diameter V-type having a pair of flanges one of which is axially movable relative to the other flange; an axially adjustable rod means extending through said hollow drive shaft and being operatively connected to both of said movable flanges; adjustment means on the other side of said motor and operatively connected to said adjustable rod means so that upon actuation of said adjustment means said adjustable rod means and said movable flanges are moved axially to increase the effective diameter of one of said pulleys and to decrease the effective diameter of the other of said pulleys; belt means operatively connecting said pulleys; and resilient means for maintaining tension in said belt means.

4. In a variable-speed transmission, the combination of: a first pulley structure of the variable-diameter V-type; a second pulley structure of the variable-diameter V-type axially aligned with said first pulley structure, each of said pulley structures having a pair of flanges one of which is axially movable relative to the other; first bearing means rigidly connected to the movable flange of said first pulley structure; second bearing means rigidly connected to the movable flange of said second pulley structure; a rod connecting said bearing means in spaced axial relation, said rod being axially aligned with said pulley structures; and adjustment means for axially moving said rod to vary simultaneously the effective diameters of said pulley structures.

5. In a variable-speed transmission, the combination of: a first pulley structure of the variable-diameter V-type; a second pulley structure of the variable-diameter V-type axially aligned with said first pulley structure, each of said pulley structures having a pair of flanges one of which is axially movable relative to the other, said movable flanges being axially adjoining each other and said other flanges being separated by said movable flanges; first bearing means rigidly connected to the movable flange of said first pulley structure; second bearing means rigidly connected to the movable flange of said second pulley structure; a rod connecting said bearing means in spaced axial relation, said rod being axially aligned with said pulley structures; and adjustment means for axially moving said rod to vary simultaneously the effective diameters of said pulley structures.

CARL E. JOHNSON.